United States Patent [19]

Benson et al.

[11] Patent Number: 5,831,767
[45] Date of Patent: Nov. 3, 1998

[54] ASYMMETRIC CUBE CORNER ARTICLE

[75] Inventors: Gerald M. Benson, Woodbury; Kenneth L. Smith, White Bear Lake, both of Minn.

[73] Assignee: Minnesota Mining and Manufacturing Company, St. Paul, Minn.

[21] Appl. No.: 660,785

[22] Filed: Jun. 6, 1996

Related U.S. Application Data

[60] Division of Ser. No. 326,588, Oct. 20, 1994, Pat. No. 5,564,870, which is a continuation-in-part of Ser. No. 139,462, Oct. 20, 1993, abandoned.

[51] Int. Cl.⁶ ............................ G02B 5/122; G02B 5/124
[52] U.S. Cl. ........................ 359/529; 359/529; 359/530; 359/531
[58] Field of Search .................. 359/529, 530, 359/531

[56] References Cited

U.S. PATENT DOCUMENTS

| | | | |
|---|---|---|---|
| 835,648 | 11/1906 | Straubel . | |
| 1,591,572 | 7/1926 | Stimson . | |
| 2,027,441 | 1/1936 | Landis | 41/34 |
| 2,310,790 | 2/1943 | Jungersen | 88/105 |
| 2,407,680 | 9/1946 | Palmquist et al. | 88/82 |
| 3,190,178 | 6/1965 | McKenzie | 88/82 |
| 3,417,959 | 12/1968 | Schultz | 249/117 |
| 3,684,348 | 8/1972 | Rowland | 350/103 |
| 3,689,346 | 9/1972 | Rowland | 156/245 |
| 3,712,706 | 1/1973 | Stamm | 350/103 |
| 3,810,804 | 5/1974 | Rowland | 156/245 |
| 3,811,983 | 5/1974 | Rowland | 156/245 |
| 3,812,706 | 5/1974 | Higgs et al. | 73/59 |
| 3,873,184 | 3/1975 | Heenan | 350/103 |
| 3,922,065 | 11/1975 | Schultz | 350/103 |
| 3,924,928 | 12/1975 | Trimble | 350/99 |
| 3,924,929 | 12/1975 | Holmen et al. | 350/103 |
| 3,926,402 | 12/1975 | Heenan | 249/117 |
| 4,025,159 | 5/1977 | McGrath | 350/105 |
| 4,066,331 | 1/1978 | Lindner | 350/103 |
| 4,149,304 | 4/1979 | Brynjegard | 29/148.4 D |
| 4,202,600 | 5/1980 | Burke et al. | 350/103 |
| 4,208,090 | 6/1980 | Heenan | 350/61 |
| 4,243,618 | 1/1981 | Van Arnam | 264/1 |
| 4,332,437 | 6/1982 | Searight et al. | 359/531 |
| 4,349,598 | 9/1982 | White | 428/161 |
| 4,478,769 | 10/1984 | Pricone et al. | 264/1.6 |
| 4,498,733 | 2/1985 | Flanagan | 350/102 |
| 4,576,850 | 3/1986 | Martens | 428/156 |
| 4,582,885 | 4/1986 | Barber | 528/28 |
| 4,588,258 | 5/1986 | Hoopman | 350/103 |
| 4,618,518 | 10/1986 | Pricone et al. | 428/40 |
| 4,668,558 | 5/1987 | Barber | 428/156 |
| 4,703,999 | 11/1987 | Benson | 359/529 |
| 4,712,867 | 12/1987 | Malek | 350/103 |
| 4,726,706 | 2/1988 | Attar | 404/14 |
| 4,775,219 | 10/1988 | Appeldorn et al. | 350/103 |
| 4,801,193 | 1/1989 | Martin | 350/103 |
| 4,895,428 | 1/1990 | Nelson et al. | 350/103 |

(List continued on next page.)

FOREIGN PATENT DOCUMENTS

| | | | |
|---|---|---|---|
| 0 269 329 A2 | 6/1988 | European Pat. Off. | G02B 5/122 |
| 9217179.6 | 4/1993 | Germany | G02B 5/124 |
| 42 36 700 A1 | 5/1994 | Germany | G02B 5/124 |
| 423464 | 2/1935 | United Kingdom . | |
| 441319 | 1/1936 | United Kingdom . | |
| 0463304 | 3/1937 | United Kingdom | 359/529 |

*Primary Examiner*—Paul M. Dzierzynski
*Assistant Examiner*—Mohammad Y. Sikder
*Attorney, Agent, or Firm*—Robert H. Jordan; Jed W. Caven; Stephen C. Jensen

[57] ABSTRACT

A cube corner article has a plurality of geometric structures formed by at least three intersecting groove sets. Each geometric structure has three faces arranged as a cube corner element. Some of the geometric structures also have a fourth face which is not a part of a cube corner element. At least one of the grooves in the three intersecting groove sets has a first and second side surface extending uniformly from a groove vertex, the first side surface forming one of the three faces and the second side surface forming the fourth face.

15 Claims, 11 Drawing Sheets

U.S. PATENT DOCUMENTS

| | | | |
|---|---|---|---|
| 4,938,563 | 7/1990 | Nelson et al. | 350/103 |
| 4,952,023 | 8/1990 | Bradshaw et al. | 359/529 |
| 5,122,902 | 6/1992 | Benson | 359/529 |
| 5,138,488 | 8/1992 | Szczech | 359/529 |
| 5,156,863 | 10/1992 | Pricone et al. | 425/363 |
| 5,171,624 | 12/1992 | Walter | 428/156 |
| 5,175,030 | 12/1992 | Lu et al. | 428/30 |
| 5,183,597 | 2/1993 | Lu | 264/1.4 |
| 5,237,449 | 8/1993 | Nelson et al. | 359/532 |
| 5,272,562 | 12/1993 | Coderre | 359/529 |
| 5,450,235 | 9/1995 | Smith et al. | 359/529 |

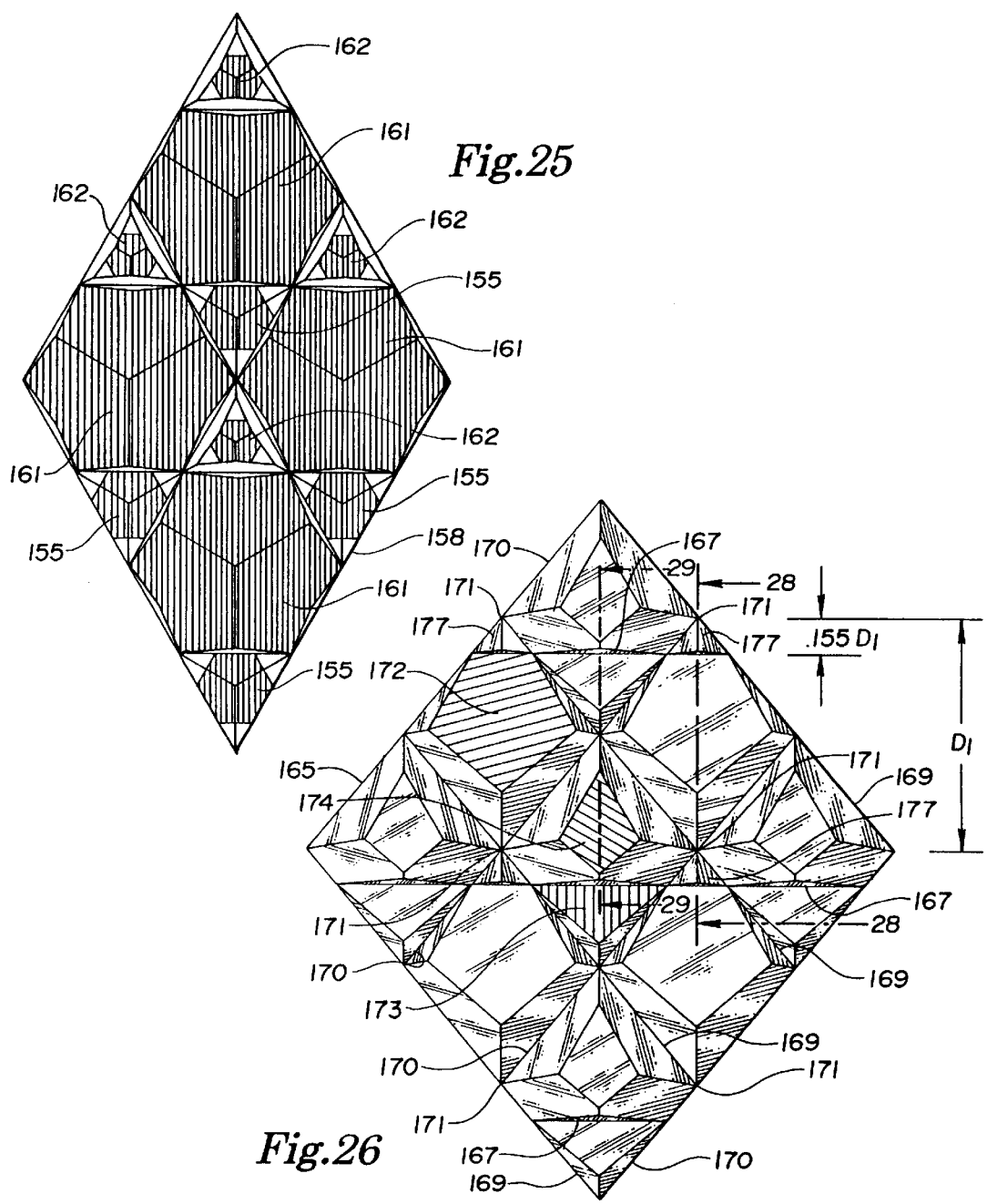

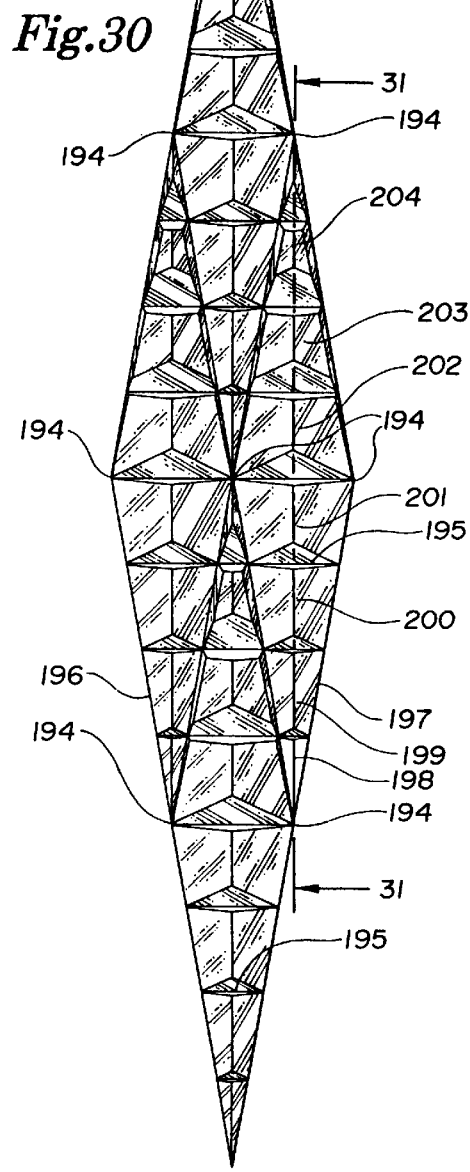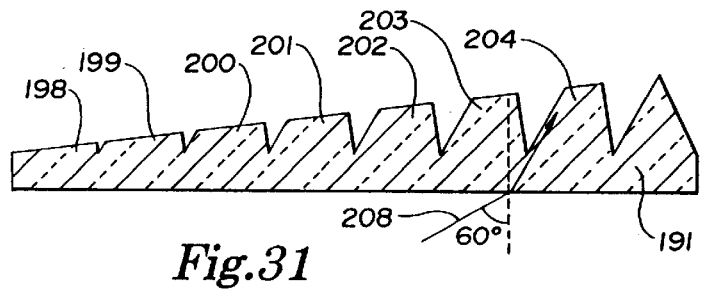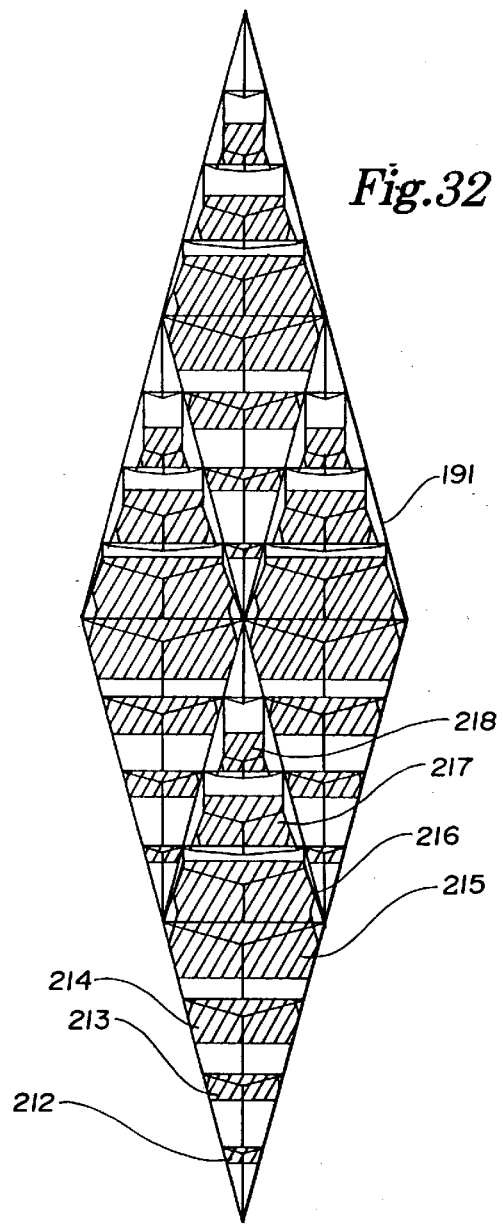

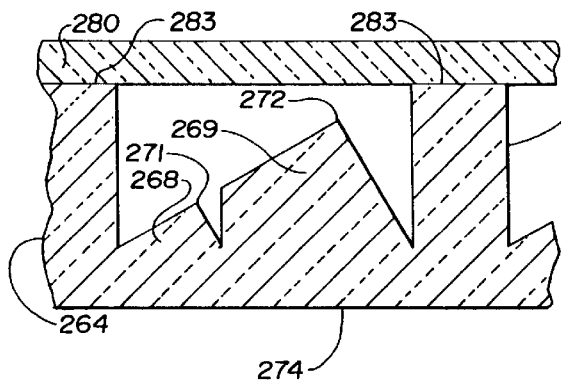
*Fig.37*
*Fig.38*
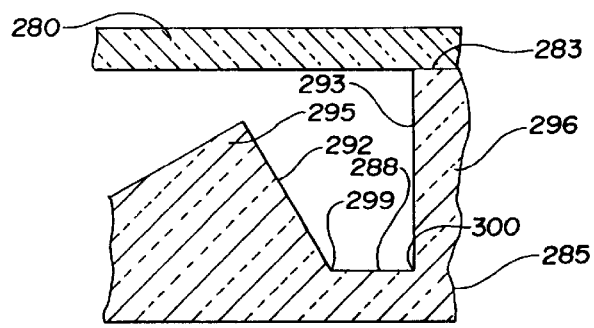
*Fig.40*
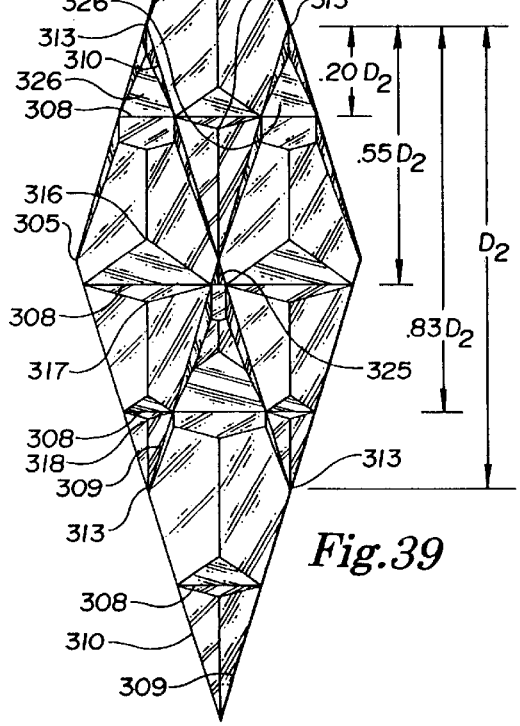
*Fig.39*
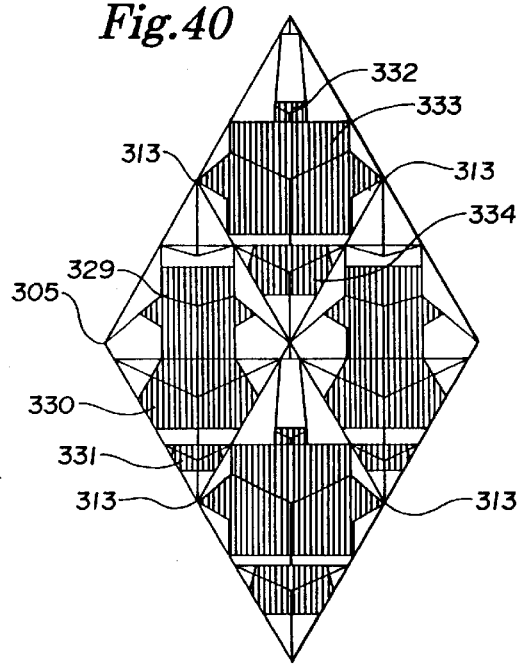

ASYMMETRIC CUBE CORNER ARTICLE

CROSS-REFERENCE TO RELATED APPLICATION

This is a division of U.S. application Ser. No. 08/326,588, filed Oct. 20, 1994, now U.S. Pat. No. 5,564,870, which is a continuation-in-part of U.S. application Ser. No. 08/139,462, filed Oct. 20, 1993, now abandoned.

FIELD OF INVENTION

This invention relates to retroreflective articles having prismatic retroreflective elements.

BACKGROUND

Many types of retroreflective elements are known, including prismatic designs incorporating one or more raised structures commonly known as cube corners. Retroreflective sheeting which employs cube corner type reflecting elements is well known. Cube corner reflecting elements are trihedral structures which have three approximately mutually perpendicular lateral faces meeting in a single corner. Light rays are typically reflected at the cube faces due to either total internal reflection or reflective coatings. The manufacture of directly machined arrays comprising retroreflective cube corner elements has many inefficiencies and limitations. Total light return and percent active aperture are adversely affected by these limitations, and overall production costs versus performance are often higher relative to the new class of articles and methods of manufacture taught below. The asymmetric arrays of this invention permit excellent manufacturing flexibility and production of cube corner element designs which are highly tailorable to particular needs.

SUMMARY OF INVENTION

The invention comprises a method of manufacturing a retroreflective cube corner article comprising the steps of providing a machinable substrate material suitable for forming reflective surfaces, and creating a plurality of geometric structures including cube corner elements in the substrate. The step of creating the cube corner elements comprises directly machining at least three sets of parallel grooves in the substrate so that only one side of at least one groove in at least one groove set forms cube corner element optical surfaces. The invention also includes retroreflective replicas of an article manufactured according to this method.

The invention also includes a method of manufacturing an article having a plurality of geometric structures including cube corner elements formed by directly machining three sets of parallel grooves into a machinable substrate. A first groove set of parallel grooves is directly machined along a first path in the substrate. A second groove set of parallel grooves is directly machined along a second path in the substrate. A third groove set comprising at least one additional groove is directly machined along a third path in the substrate. Only one side of at least one groove in at least one groove set forms cube corner element optical surfaces.

The invention also comprises a retroreflective cube corner article which is a replica of a machined substrate in which a plurality of geometric structures including cube corner elements are directly machined. Each cube corner element is bounded by a groove from each of three sets of parallel grooves. Only one side of at least one groove in at least one groove set forms cube corner element optical surfaces. The article exhibits asymmetric entrance angularity when rotated about an axis within the plane of the substrate.

The invention also comprises a retroreflective article which is a replica of a directly machined substrate having a plurality of geometric structures including directly machined canted cube corner elements. The cube corner elements are arranged between a plurality of grooves in the substrate which intersect at angles of other than 90°. Each cube corner element has a symmetry axis, and the symmetry axis of substantially every one of the cube corner elements in the article is in substantially parallel relation to each other.

The invention also comprises a retroreflective cube corner element composite sheeting comprising a plurality of zones of retroreflective cube corner elements in an ordered array within each zone. The array of each zone comprises a replica of a directly machined substrate in which a plurality of cube corner elements are machined in the substrate. Each cube corner element is bounded by a groove from each of three sets of parallel grooves in the substrate, and only one side of at least one groove in at least one groove set forms cube corner element optical surfaces.

The invention also comprises a retroreflective cube corner element composite sheeting comprising a plurality of zones of retroreflective cube corner elements in an ordered array within each zone. The array of each zone comprises a replica of a directly machined substrate in which a plurality of cube corner elements are machined in the substrate between a plurality of grooves which intersect at angles of other than 90°. Each cube corner element has a symmetry axis, and the symmetry axis of substantially every one of the cube corner elements within each zone is in substantially parallel relation to each other.

BRIEF DESCRIPTION OF DRAWINGS

FIG. 25 is a plan view of the active apertures for the array shown in FIG. 24.

FIG. 26 is a plan view of a portion of a directly machined asymmetric array including three different cube types.

FIG. 30 is a plan view of an asymmetric cube corner element array formed from primary and secondary grooves intersecting at included angles of 82°, 82° and 16 °.

FIG. 31 is a section view of the array taken along line 31—31 in FIG. 30.

FIG. 32 is a view of the active apertures of the array shown in FIGS. 30.

FIG. 37 is a section view of one embodiment of an asymmetric array having geometric structures with truncated surfaces.

FIG. 38 is a side view of another embodiment of an asymmetric array including the use of a separation surface.

FIG. 39 is a plan view of a portion of a directly machined asymmetric array formed from primary and secondary grooves intersecting within included angles 74°, 74° and 32°.

FIG. 40 is a plan view of the active apertures of the array shown in FIG. 39.

DETAILED DESCRIPTION OF ILLUSTRATIVE EMBODIMENTS

The manufacture of retroreflective cube corner element arrays is accomplished using molds made by different techniques, including those known as pin bundling and direct machining. Molds manufactured using pin bundling are made by assembling together individual pins which each have an end portion shaped with features of a cube-corner retroreflective element. U.S. Pat. No. 3,926,402 (Heenan et al) and U.S. Pat. No. 3,632,695 (Howell) are examples of pin bundling.

The direct machining technique, also known generally as ruling, comprises cutting portions of a substrate to create a pattern of grooves which intersect to form cube corner elements. The grooved substrate is referred to as a master from which a series of impressions, i.e. replicas, may be formed. In some instances, the master is useful as a retroreflective article, however replicas, including multi-generational replicas, are more commonly used as the retroreflective article. Direct machining is an excellent method for manufacturing master molds for small micro-cube arrays. Small micro-cube arrays are particularly beneficial for producing thin replica arrays with improved flexibility, such as continuous rolled goods for sheeting purposes. Micro-cube arrays are also more conducive to continuous process manufacturing. The process of manufacturing large arrays is also relatively easier using direct machining methods rather than other techniques. One example of direct machining is shown in U.S. Pat. No. 4,588,258 (Hoopman).

Figure 1:
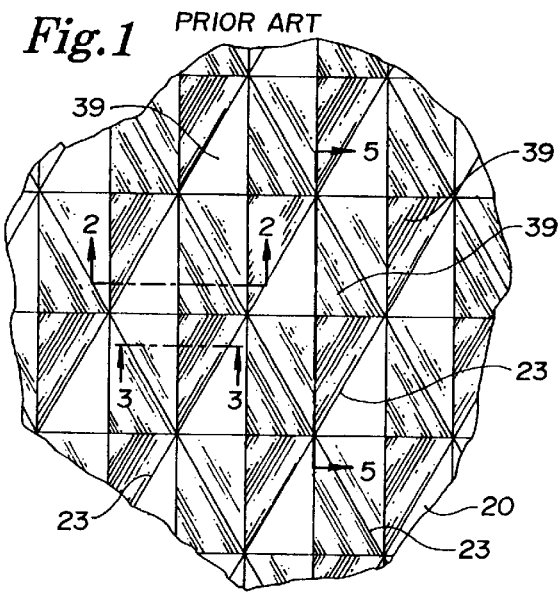
FIG. 1 is a plan view of a portion of a directly machinable substrate.
Figure 4:
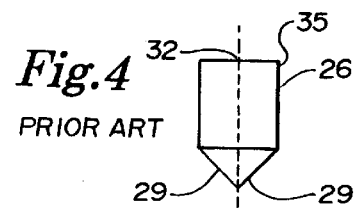
FIG. 4 is a schematic elevation view of a machine tool for direct machining.
Figure 2:
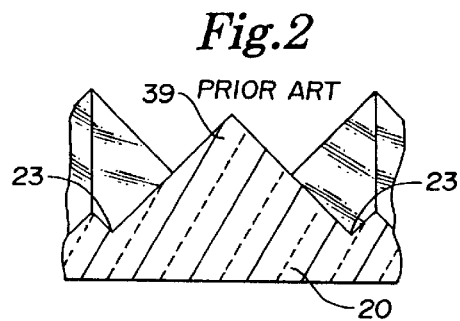
FIG. 2 is a section view of the substrate taken along line 2—2 in FIG. 1.
Figure 3:
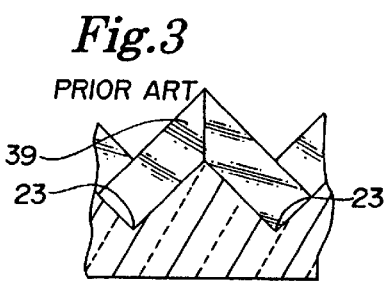
FIG. 3 is a section view of the substrate taken along line 3—3 in FIG. 1.

FIG. 1 illustrates a method by which directly machined masters of conventional cube arrays are manufactured. A directly machinable substrate 20 receives a plurality of parallel grooves 23, arranged in two non-parallel sets. Grooves through directly machinable substrate 20 are formed by a machine tool with two opposing cutting surfaces for cutting cube corner optical faces. Examples of shaping, ruling, and milling techniques suitable for forming directly machined grooves are discussed in U.S. Pat. No. 3,712,706 (Stamm). The two groove sets 23 produce the partial cube shapes 39 depicted in the sectional views of FIG. 2 and FIG. 3. Machine tool 26, such as that shown in FIG. 4, is typically mounted on a post 35 and has a cutting surface 29 on each side of a tool central axis 32.

Figure 5:
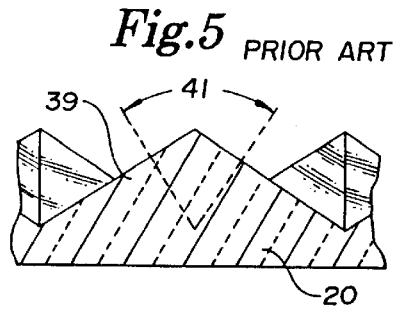
FIG. 5 is a section view of the substrate taken along line 5—5 in FIG. 1, with an additional groove in shaded lines.
Figure 6:
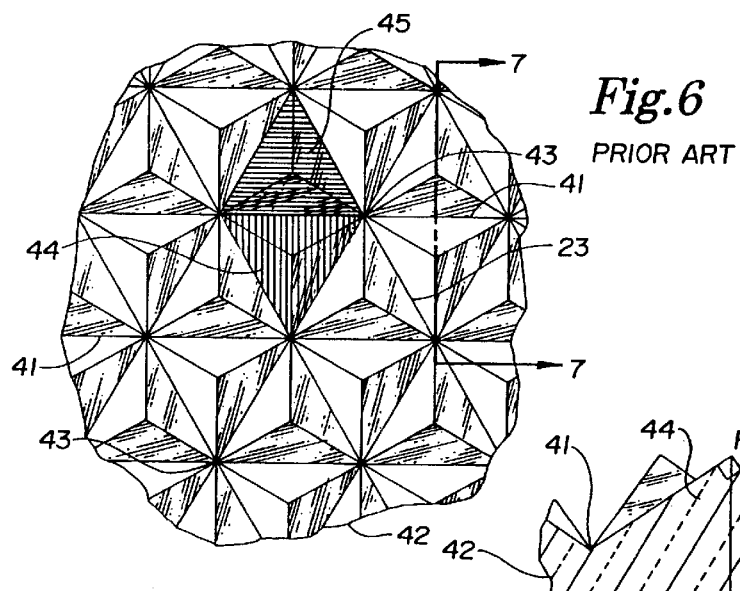
FIG. 6 is a plan view of a portion of a directly machined array derived from matched pairs of cube corner reflecting elements.
Figure 7:
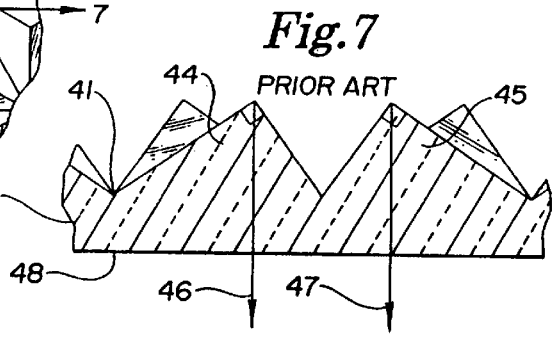
FIG. 7 is a section view of the array taken along line 7—7 in FIG. 6, and showing individual cube corner element symmetry axes that are perpendicular to a base plane.

In FIGS. 1–4, partial cube shapes 39 are shown as rhombus shaped structures formed in substrate 20. At least two grooves 23 in both non-parallel groove sets are required to produce shapes 39. A third groove 41, as shown in sectional view dashed lines in FIG. 5, is required to produce conventional cube corner elements. Portions of a conventional cube array 42 after completion of the three groove sets are shown in FIGS. 6 and 7. Both sides of all grooves 23, 41 form cube corner element optical surfaces in array 42. An equilateral triangle is formed at the base of each cube corner reflecting element 44, 45. The grooves 23 and 41 mutually intersect at representative locations 43. Another example of this grooving is shown in U.S. Pat. No. 3,712,706 (Stamm). U.S. Pat. Nos. 4,202,600 (Burke et al) and 4,243,618 (Van Arnam) also disclose, and incorporate by reference, the triangular based corner reflecting elements or prisms shown in Stamm. The Burke et al patent discloses tiling of these prisms in multiple differently oriented zones to produce an appearance of uniform brightness to the eye when viewed at a high angle of incidence from at least a minimum expected viewing distance.

Conventional retroreflective cube corner element arrays are derived from a single type of matched pairs, i.e. geometrically congruent cube corner retroreflecting elements rotated 180°. These matched pairs are also typically the same height above a common reference plane. One example of this matched pair derivation is shown in FIG. 6 with matched shaded pair of cube corner retroreflecting elements 44, 45. Other examples of this fundamental matched pair concept relating to conventional cube arrays is shown in U.S. Pat. No. 3,712,706 (Stamm), U.S. Pat. No. 4,588,258 (Hoopman), U.S. Pat. No. 1,591,572 (Stimson) and U.S. Pat. No. 2,310,790 (Jungersen). U.S. Pat. No. 5,122,902 (Benson) discloses another example of matched pairs of cube corner retroreflecting elements having coincident base edges, although these may be positioned adjacent and opposite to each other along a separation surface.

Another type of matched pair of cube corner elements is disclosed in German patent reference DE 42 42 264 (Gubela) in which a structure is formed having a micro-double triad and two single traids within a rhombic body. The structure is formed in a work piece using turning angles of 60 degrees and grinding directions which do not cross each other at one point, resulting in only two of the directions having a common point of intersection.

Figure 8:
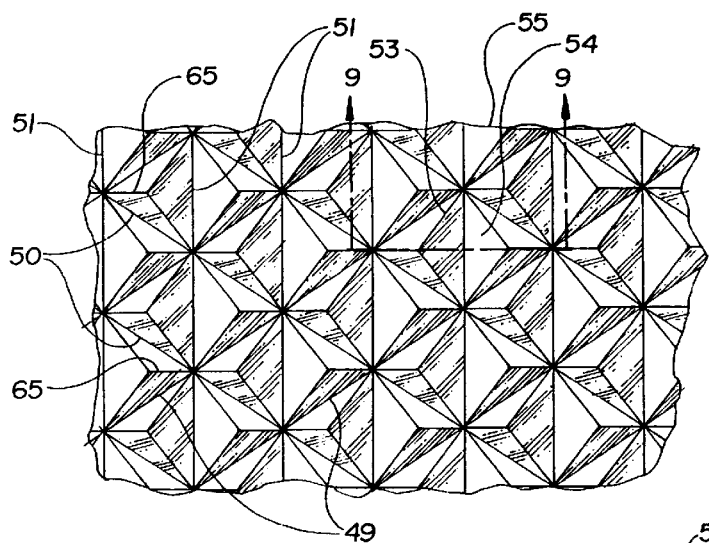
FIG. 8 is a plan view of a portion of a directly machined array comprising canted cube corner elements.
Figure 9:
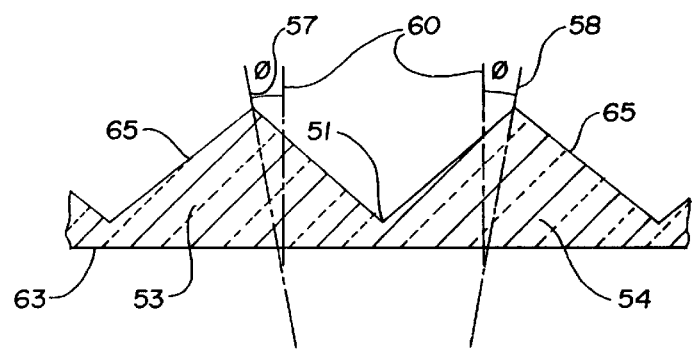
FIG. 9 is a section view of the array taken along line 9—9 in FIG. 8, and showing non-parallel symmetry axes.

The above examples of cube corner element retroreflective arrays comprise non-canted cubes which have individual symmetry axes 46, 47 that are perpendicular to a base plane 48, as shown in FIG. 7. The symmetry axis is a central or optical axis which is a trisector of the internal or dihedral angles defined by the faces of the element. However, in some practical applications it is advantageous to cant or tilt the symmetry axes of the matched pair of cube corner retroreflective elements to an orientation which is not perpendicular to the base plane. The resulting canted cube-corner elements combine to produce an array which retroreflects over a wide range of entrance angles. This is taught in U.S. Pat. No. 4,588,258 (Hoopman), and is shown in FIGS. 8 and 9. The Hoopman structure is manufactured with three sets of parallel V-shaped grooves 49, 50, 51 that intersect to form matched pairs of canted cube corner elements 53, 54 in array 55. Both sides of all grooves 49, 50, 51 form cube corner element optical surfaces in array 55.

FIG. 9 illustrates the symmetry axis 57 for cube corner element 53, and the symmetry axis 58 for cube corner element 54. The symmetry axes are each tilted at angle ø with respect to a line 60 that lies normal to a base plane 63, or the front surface, of the element. The base plane is usually co-planar or parallel with the front surface of a sheeting comprising the cube corner element array. Cube corner elements 53, 54 are geometrically congruent, exhibit symmetric optical retroreflective performance with respect to entrance angle when rotated about an axis within the plane of the substrate, and have symmetry axes which are not parallel to each other. Entrance angle is commonly defined as the angle formed between the light ray entering the front surface and line 60.

Canting may be in either a forward or backward direction. The Hoopman patent includes disclosure of a structure having an amount of cant up to 13° for a refractive index of 1.5. Hoopman also discloses a cube with a cant of 9.736°. This geometry represents the maximum forward cant of cubes in a conventional array before the grooving tool damages cube optical surfaces. The damage normally occurs during formation of a third groove when the tool removes edge portions of adjacent elements. For example, as shown in FIG. 8, for forward cants beyond 9.736°, the cube edge 65 is formed by the first two grooves 49, 50 and is removed by forming the primary groove 51. U.S. Pat. No. 2,310,790 (Jungersen) discloses a structure which is canted in a direction opposite that shown in the Hoopman patent.

Figure 10:
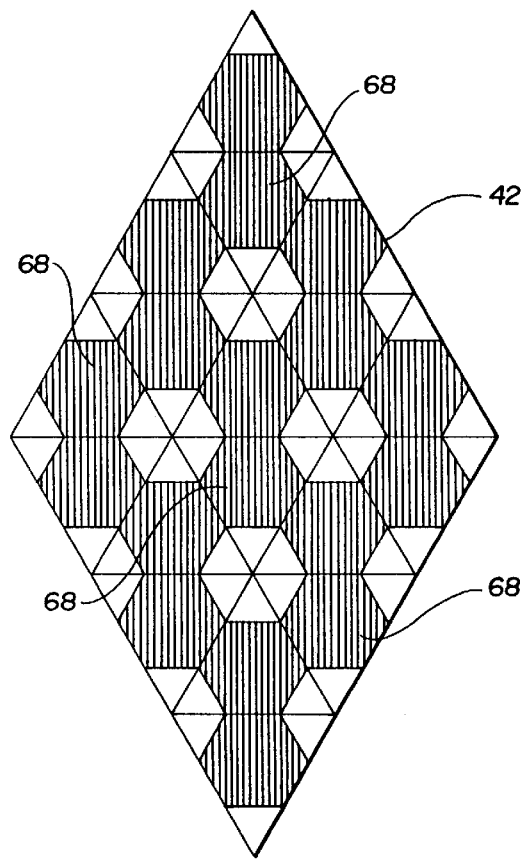
FIG. 10 is a plan view of the active apertures of the array shown in FIGS. 6 and 7.

For these conventional arrays, optical performance is conveniently defined by the percent of the surface area that is actually retroreflective, i.e. which comprises an effective area or active aperture. The percent active aperture varies as a function of the amount of canting, refractive index, and the entrance angle. For example, shaded areas 68 of FIG. 10 represent the active apertures of the individual cube corner retroreflective elements in array 42. The active apertures shown in FIG. 10 are a uniform hexagonal size and shape. The percent active aperture of this equilateral 60°–60°–60° base angle geometry array at a zero entrance angle is about 67 percent, which is the maximum possible for a conventional three groove set array.

At non-zero entrance angles, conventional arrays display, at most, two different aperture shapes of roughly similar size. These result from the single type of geometrically congruent matched pairs of conventional cube corner elements. Canted conventional cube corner arrays exhibit similar trends, although the shape of the aperture is affected by the degree of canting.

As discussed in U.S. Pat. No. 5,171,624 (Walter), diffraction from the active apertures in nearly orthogonal conventional cube corner arrays tends to produce undesireable variations in the energy pattern or divergence profile of the retroreflected light. This results from all the active apertures being roughly the same size in conventional arrays and therefore exhibiting roughly the same degree of diffraction during retroreflection.

Figure 12:
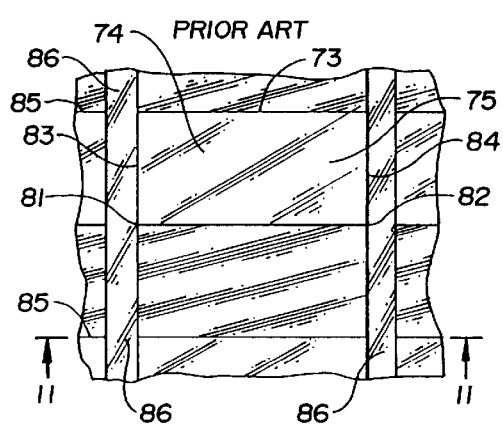
FIG. 12 is a plan view of the array shown in FIG. 11.
Figure 11:
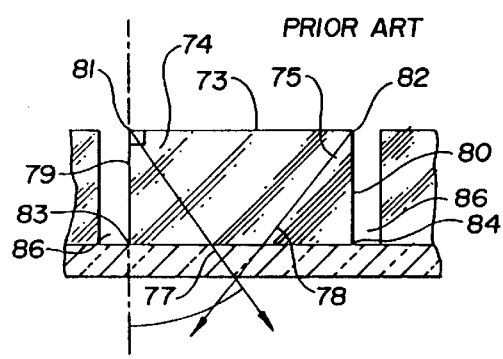
FIG. 11 is a side view of a two groove set cube corner element array having an extreme backward cant.

Some conventional cube corner arrays are manufactured with additional optical limitations, perhaps resulting from canting or other design features, to provide very specific performance under certain circumstances. One example of this is the structure disclosed in U.S. Pat. 4,349,598 (White). FIGS. 11 and 12 schematically depict, in side and plan views respectively, White's extreme backward cant associated with one geometric limit of a conventional cube design. In this design, cube structure 73 is derived from a matched pair of cube corner elements 74, 75 with symmetry axes 77, 78. Cube corner elements 74, 75 are each canted in a backward direction to the point that each of the base triangles is eliminated, resulting in two vertical optical faces 79, 80. This occurs when the cube peaks 81, 82 are directly above the base edges 83, 84 and the base triangles have merged to form a rectangle. Only two groove sets are required, using tools with opposing cutting surfaces, to create this cube structure in a substrate. One groove set has a 90° V-shaped cut 85 and the other groove set has a rectangular cut shaped as a channel 86. Both sides of all grooves 85, 86 form cube corner element optical surfaces in array 73. In the White design, the pair of cube corner reflecting elements are specifically arranged to provide a high active aperture at large entrance angles.

Figure 14:
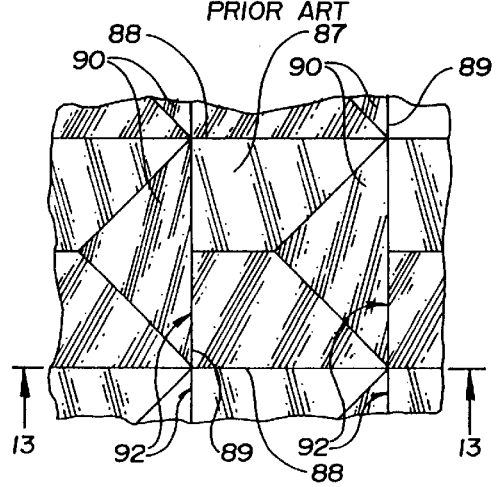
FIG. 14 is a plan view of the array shown in FIG. 13.
Figure 13:
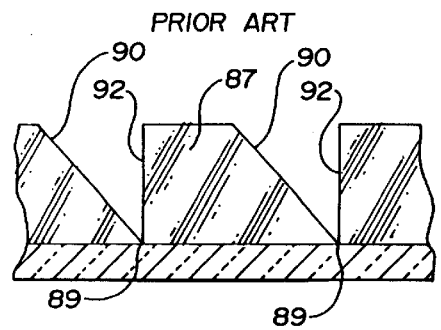
FIG. 13 is a side view of a two groove set cube corner element array having at least one vertical retroreflective face.

A further modification to the conventional cube corner arrays and to the White design is disclosed in U.S. Pat. No. 4,895,428 (Nelson et al). The cube structure 87 disclosed by Nelson et al, shown in the side view of FIG. 13 and the plan view of FIG. 14, is derived by reducing the length of the White element 73 and by eliminating one of the cube vertical optical faces 79, 80. Like the White design, manufacture of the Nelson et al structure also requires only two groove sets 88, 89. Both sides of all the grooves 88 form cube corner element optical surfaces in array 87. Nelson must also have at least one vertical retroreflective face. This is accomplished by replacing the tool for cutting the White rectangular channel with an offset tool. The Nelson et al tool forms a non-retroreflective surface 90, using a tool relief surface, and a vertical retroreflective surface 92 using the tool vertical sidewall.

Conventional cube corner retroreflective element designs include structural and optical limitations which are overcome by use of the asymmetric cube corner retroreflective element structures and methods of manufacture described below. Use of this new class of asymmetric retroreflective cube corner element structures and manufacturing methods permits diverse cube corner element shaping. For example, cubes in a single array may be readily manufactured with raised discontinuous geometric structures having different heights and non-vertical optical surfaces. Non-vertical cube surfaces are more easily metalized, processed, and replicated. Use of asymmetric methods and structures also permits manufacture of cubes which have highly tailorable asymmetric optical performance. For example, at many entrance angles, including at zero entrance angle, asymmetric structures outperform conventional structures by exhibiting higher percent active apertures or by providing improved divergence profiles, or both. Asymmetric manufacturing techniques also produce enhanced optical performance resulting from closely spaced intermixed cubes with different active aperture shapes and sizes. This presents more uniform appearances of asymmetric arrays over a wide range of viewing distances under both day and night observation conditions. These advantages of asymmetric cube corner elements enhance the usefulness of articles having these elements. Such articles include, for example, traffic control materials, retroreflective vehicle markings, photoelectric sensors, directional reflectors, and reflective garments for human or animal use.

Half of the cubes in conventional arrays derived from matched pairs of cubes are frequently not actively retroreflecting light at a given entrance angle. Asymmetric cubes are not derived from the simple matching of pairs of cubes or from a modification of conventional pairs of cubes. Therefore, asymmetric arrays permit placement of optically active cubes in the areas which, if conventional, would not be optically active.

Use of asymmetric cube corner element articles eliminates a structural requirement in some conventional cube corner elements for at least one vertical optical face in each cube corner element. This provides significant advantages due to the additional care and related cost which is required to manufacture vertical optical faces.

Asymmetric cube corner element arrays may be of simple or composite construction. Manufacture of asymmetric cube corner element master arrays, as well as multi-generational replicas, results in diverse and highly adaptable optical performance and cost efficiencies. These and other advantages are described more fully below.

A substrate suitable for forming retroreflective surfaces according to this invention may comprise any material suitable for forming directly machined grooves or groove sets. Suitable materials should machine cleanly without burr formation, exhibit low ductility and low graininess, and maintain dimensional accuracy after groove formation. A variety of materials such as machinable plastics or metals may be utilized. Suitable plastics comprise thermoplastic or thermoset materials such as acrylics or other materials. Suitable metals include aluminum, brass, nickel, and copper. Preferred metals include non-ferrous metals. Preferred machining materials should also minimize wear of the cutting tool during formation of the grooves.

Figure 15:
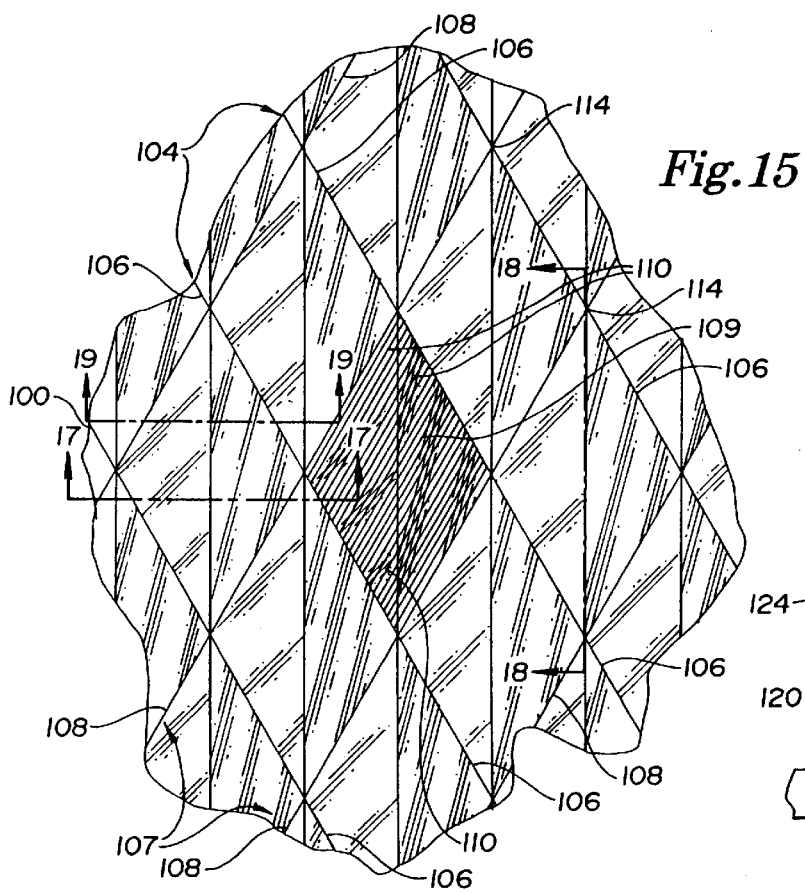
FIG. 15 is a plan view of a directly machined substrate.

FIG. 15 discloses a method by which directly machined masters of asymmetric cube corner element arrays are manufactured. A directly machined substrate 100 receives a plurality of parallel grooves arranged in two non-parallel sets, which may have variable spacing between grooves. Grooves may be formed using either single or multiple passes of a machine tool through substrate 100. Each groove is preferably formed by a machine tool which has only one side configured for cutting a retroreflective non-vertical optical surface and which is maintained in an approximately constant orientation relative to the substrate during the formation of each groove. Each groove forms the side surfaces of geometric structures which may include cube corner optical or non-optical elements.

Figure 17:
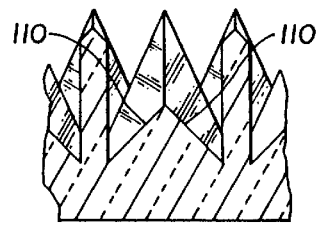
FIG. 17 is a section view of the substrate taken along line 17—17 in FIG. 15.
Figure 19:
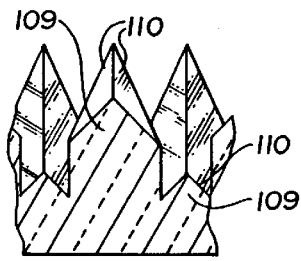
FIG. 19 is a section view of the substrate taken along line 19—19 in FIG. 15.
Figure 18:
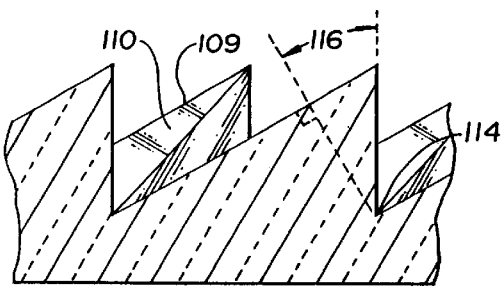
FIG. 18 is a section view of the substrate taken along line 18—18 in FIG. 15.

A more detailed description of a method of manufacturing an asymmetric cube corner element array is to directly machine a first groove set 104 of parallel grooves 106 cut into substrate 100 along a first path. A second groove set 107 of parallel grooves 108 is then directly machined along a second path in substrate 100. The machining of the first and second groove sets, also referred to as the two secondary grooves or secondary groove sets, creates a plurality of rhombus or diamond shaped partial cube sub-elements 109, depicted in shaded highlight in one instance for ease of recognition. Each partial cube sub-element comprises two orthogonal optical faces 110, as shown in FIGS. 15, 17 and 19. Preferably, only one side of grooves 106 and 108 form the orthogonal faces 110 on partial cube sub-element 109. The secondary grooves intersect at locations 114. Asymmetric arrays may be compared to conventional arrays at this point of manufacture by comparing analogous views of FIGS. 1 and 15, 2 and 19, 3 and 17, and 5 and 18. After formation of the secondary grooves, a third or primary groove set, which may contain as few as one groove, is cut along a third path in substrate 100. In FIG. 18, a representative primary groove 116, which in this example mutually intersects the secondary grooves 106 and 108, is shown in dotted lines. A more detailed discussion of such primary groove(s) is found below in relation to groove set 128 and groove(s) 130 depicted in the array embodiment of FIG. 20.

Figure 16:
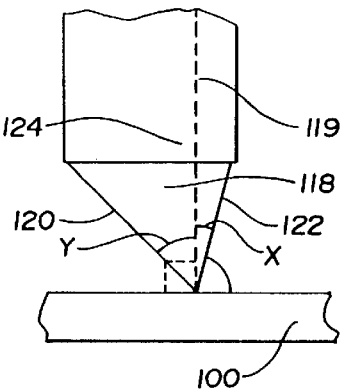
FIG. 16 is a schematic elevation view of a half angle machine tool used to form the grooves in the substrate shown in FIG. 15.

Each of the secondary grooves 106, 108 are preferably formed using a novel half angle tool 118, shown in one embodiment in FIG. 16. The half angle tool 118 is typically mounted on a post 119 with a post axis 124. Half angle tool 118 comprises a cutting surface 120 for cutting retroreflective optical surfaces into substrate 100, and a relief surface 122. Relief surface 122 may actually cut substrate 100, but it will preferably not cut or shape optical surfaces which provide retroreflection. The relief angle X may be any angle, although a preferred range of angles is between 0° and 30°. In FIGS. 15, and 17–23 relief angle X is 0°. The tool side angle Y shown in FIG. 16 is non-zero and preferably specified to create orthogonal or nearly orthogonal cube optical surfaces. This provides a preferred machine tool which has only one side configured for cutting an optical surface of a cube corner element.

As shown in FIG. 16, the half angle tool 118 is typically mounted offset on the post axis 124 with tool side angle x not equal to relief angle y. In this case, the tool axis is set perpendicular to the substrate during direct machining. Alternatively, the half angle tool 118 may be mounted centered on the post axis 124. Tool side angle x will equal relief angle y in this case, and the tool axis 124 is tilted relative to the substrate during direct machining. Intermediate combinations of offset tool mounting and tilting of the post during direct machining may also be beneficially utilized to produce the desired groove side and relief angles in the substrate. In FIGS. 15, and 17–23, groove side angle for secondary grooves 106, 108, is the same. However, different groove side angles may be used provided corresponding variations in relative secondary groove orientation is utilized to maintain orthogonal or nearly orthogonal partial cube sub-element surfaces.

Figure 20:
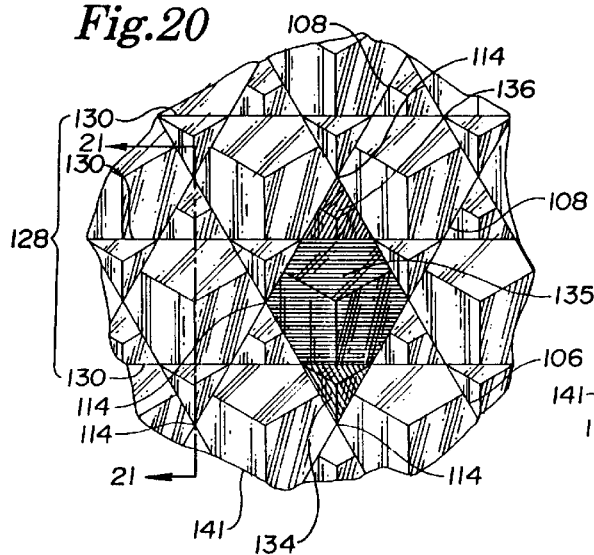
FIG. 20 is a plan view of a portion of a directly machined cube corner element array having three non-mutually intersecting groove sets.
Figure 21:
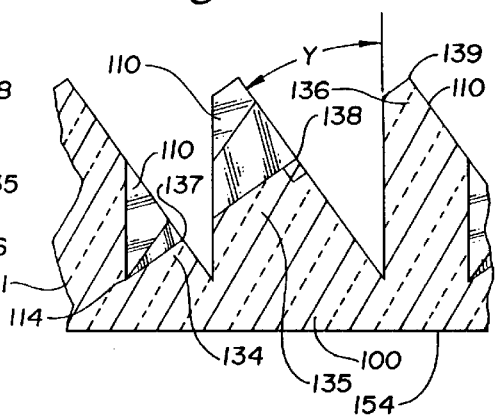
FIG. 21 is a section view of the array taken along line 21—21 in FIG. 20.

After formation of the secondary grooves, a third or primary groove set 128, which may contain as few as one groove 130, is preferably cut using a pass along a third path in substrate 100. The addition of a plurality of parallel primary grooves 130 is shown in FIGS. 20 and 21. Third groove set 128 is cut through partial cube sub-elements so that non-canted individual cube corner elements 134, 135, 136, with cube peaks 137, 138, 139 are formed by the intersections of the primary groove(s) with the orthogonal faces of the partial cube sub-elements. Primary grooves 130 may intersect the secondary grooves either individually or at the locations of the secondary groove intersections. Another embodiment of this method of manufacturing asymmetric cube corner elements is to directly machine three non-parallel sets of grooves into substrate 100 in any order using at least one machine tool configured similarly to half angle tool 118.

The invention also comprises a retroreflective cube corner article which is a replica of a directly machined substrate in which a plurality of geometric structures including cube corner elements are machined in the substrate. In this embodiment of the invention, each cube corner element is bounded by at least one groove from each of three sets of parallel grooves in the substrate. Only one side of at least one groove in at least one groove set forms cube corner element optical surfaces. It is recognized that grooves or groove sets in a method of forming cube corner elements according to this invention may comprise a different scope and meaning from grooves or groove sets which bound or form a cube corner element in known articles. For example, in known articles, multiple passes of a machine tool may be required to form a single groove.

Other embodiments of this method include creation of an article, or replicas of the article, which further modify the shape of the retroreflected light pattern. These embodiments comprise at least one groove side angle in at least one set of grooves which differs from the angle necessary to produce an orthogonal intersection with other faces of elements defined by the groove sides. Similarly, at least one set of grooves may comprise a repeating pattern of at least two groove side angles that differ from one another. Shapes of grooving tools, or other techniques, may create cube corner elements in which at least a significant portion of at least one cube corner element optical face on at least some of the cubes are arcuate. The arcuate face may be concave or convex. The arcuate face, which was initially formed by one of the grooves in one of the groove sets, is flat in a direction parallel to said groove. The arcuate face may be cylindrical, with the axis of the cylinder parallel to said groove, or may have a varying radius of curvature in a direction perpendicular to said groove.

FIG. 20 further discloses asymmetric cube array 141 in which primary grooves 130 do not pass through the secondary grooves 106, 108 at the mutual intersection locations 114 of the secondary grooves. Primary grooves 130 are equally spaced and centered on secondary groove intersection locations 114. Array 141 presents yet another novel feature of asymmetric cube corner technology. In particular, a method is disclosed for manufacturing a cube corner article by directly machining three non-parallel non-mutually intersecting sets of grooves. Preferably, these sets intersect at included angles less than 90°. It is recognized that certain machining imprecisions may create minor, unintentional separation between grooves at intersections. However, this invention involves intentional and substantial separation. For example, a separation distance between the intersections of the grooves within two groove sets with at least one groove in a third groove set which is greater than about 0.01 millimeters would likely provide the advantages of this feature. However, the precise minimum separation distance is dependent on the specific tooling, substrate, process controls, and the desired optical performance sought.

Non-mutually intersecting groove sets create individual cube corner elements with different active aperture sizes and shapes. Arrays may even be formed with cube corners created by a combination of mutually and non-mutually intersecting groove sets. The position of the groove sets is controlled to produce maximum total light return over a desired range of entrance angles. Also the distance between grooves in at least one groove set might not be equal to the distance between grooves in at least another of the groove sets. It is also possible to machine at least one set of parallel grooves into a substrate in a repeating fashion with the set comprising a distance between grooves which is optionally variable at each machining of the set. Also, a portion of any one of the grooves may be machined to a depth that is different from at least one other groove depth.

Figure 22:
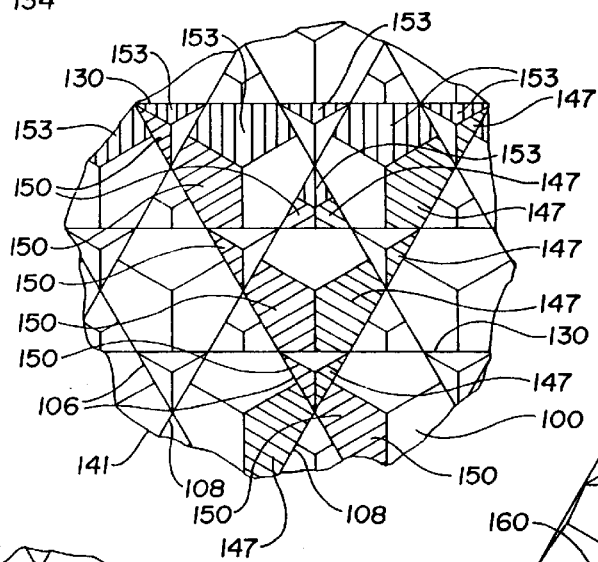
FIG. 22 is a plan view of a portion of a directly machined array showing the cube surfaces formed by each groove.

FIGS. 21 and 22 illustrate the multiple cube surfaces which are formed during direct machining of a groove in substrate 100. Groove 108 is formed by machining surfaces 147 on numerous cube corner elements. Groove 106 is formed by machining surfaces 150, and groove 130 is formed by the machining of surfaces 153. FIGS. 20–22 show how the tool(s) used with the methods of this invention form more than one optical surface simultaneously. FIG. 21 shows that the plurality of optical surfaces and cube peaks 137, 138, 139 are created at different heights above a common reference plane 154. Asymmetric cube corner element arrays are preferably formed using at least three sets of parallel grooves where only one side of at least one groove in at least one of the groove sets forms cube corner element optical surfaces.

Figure 23:
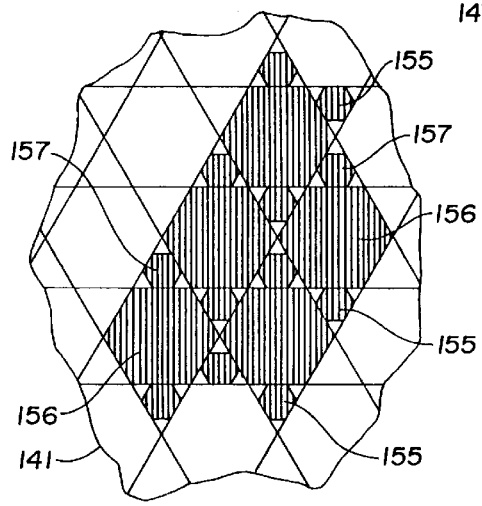
FIG. 23 is a plan view of the active apertures of a portion of an asymmetric retroreflective cube corner element array shown in FIG. 22.

FIG. 23 is a plan view of a portion of asymmetric retroreflective cube corner element array 141 depicted in FIG. 22 with shaded areas 155, 156, 157 representing three different active apertures, intermixed and arranged in close proximity and corresponding to cube types 134, 135, and 136. A conventional non-canted cube corner element array with an equilateral base triangle, at 0° entrance angle, provides a maximum of only about 67 percent active aperture. However, a non-canted asymmetric cube corner element array similar to that shown in FIGS. 22 and 23 may have a percent active aperture greater than 70 percent and possibly as high as about 92 percent at 0° entrance angle.

FIGS. 15 and 17–23 disclose arrays manufactured with a half angle tool 118 with a relief angle X equal to zero. The tool axis 124 was set perpendicular to the substrate during direct machining. A non-zero relief angle X was used to machine array 158 in FIG. 24 and to produce nonvertical non-reflective relief surfaces 160. This relief angle selection flexibility provided by asymmetric array manufacturing methods permits controllable selection of percent active aperture loss due to increased relief angles. Also, non-vertical relief surfaces 160 are quite helpful during the manufacture and mechanical separation of replicas since interlocking vertical faces are eliminated.

The effect that relief angles have on the formation of active apertures is shown in FIG. 25, in which differently sized shaded areas 155, 161, 162 denote the active apertures at 0° entrance angle. In this non-canted geometry with a 3° relief angle, it is possible to achieve 84 percent active aperture using the asymmetric cube design. Further, multiple differently sized apertures are intermixed and arranged in close proximity in array 158. This example of an asymmetric array highlights at least one other important distinction over conventional arrays. The asymmetric arrays of this invention permit manufacture of near vertical faces which are not retroreflective optical faces. This allows excellent manufacturing flexibility and permits production of cube corner element designs which are highly tailorable to particular needs.

Figure 27:
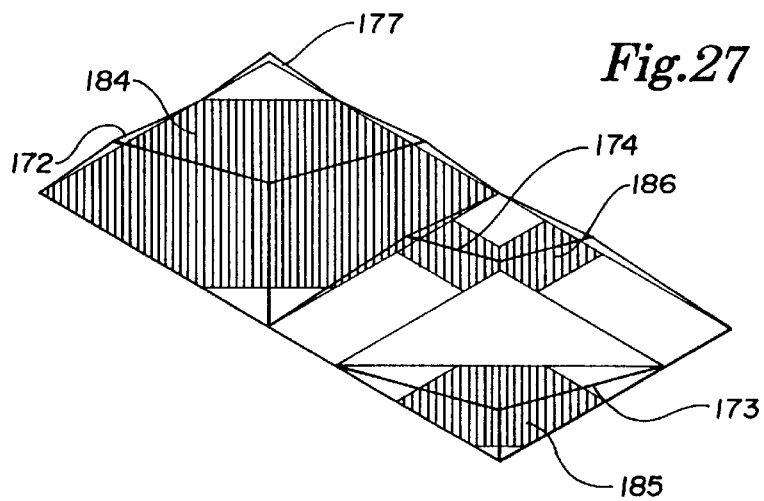
FIG. 27 is a perspective view of the active apertures of the array shown in FIG. 26.

FIGS. 26 and 27 illustrate an asymmetric array 165 with the symmetry axis canted forward by 21.78°. This amount of forward canting is beyond the 9.736° limit associated with conventional cube arrays. Each of the primary grooves 167 has a 4° relief angle, and each of the secondary grooves 169, 170 has a 20° relief angle. The secondary groove intersection locations 171 are designed with a spacing distance $D_1$. Primary grooves 167 are equally spaced, also with the distance $D_1$, and are positioned at $0.155D_1$ from each adjacent intersection location 171. This pattern is repeated in other partial cube sub-elements. In the array of FIG. 26, there are three different cube types depicted by numerals 172, 173, and 174 respectively. Trihedron 177 is an example of a structure formed by asymmetric cube corner element technology which is not retroreflective because the three faces are not orthogonal.

FIG. 27 shows the multiple differently sized and shaped active apertures 184, 185, 186, intermixed and arranged in close proximity, and corresponding to the three cube types numbered 172, 173, and 174 at a 60° entrance angle and a refractive index of 1.59. Total percent active aperture for array 165 is roughly 59 percent under these conditions. This design is useful in applications requiring high brightness at high entrance angles, for example, in pavement markers, roadway dividers, barriers, and similar uses.

Figure 28:
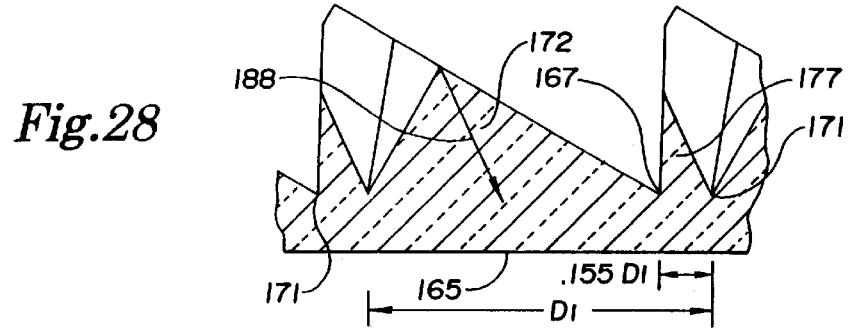
FIG. 28 is a section view of the array taken along line 28—28 in FIG. 26.
Figure 29:
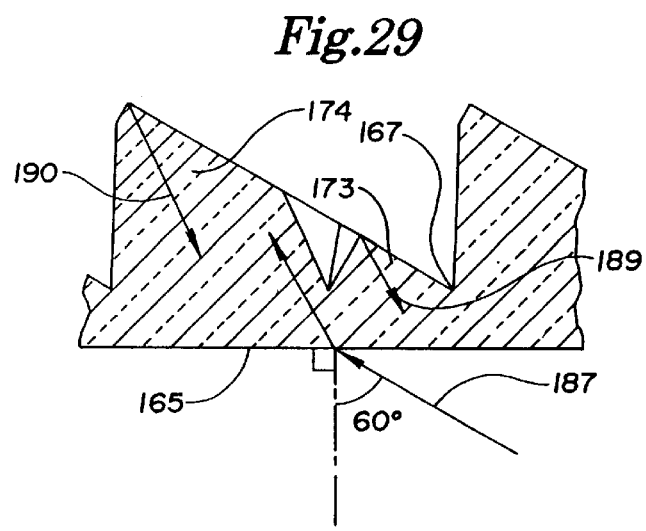
FIG. 29 is a section view of the array taken along line 29—29 in FIG. 26.

FIGS. 28 and 29 are side section views of canted asymmetric array 165. FIG. 28 shows cube 172 with a symmetry axis 188. FIG. 29 shows cubes 173, 174 with symmetry axes 189, 190 respectively. Although the shape of each of the retroreflective cubes 172, 173, 174 differs, the symmetry axes 188, 189, 190 are essentially parallel. FIG. 29 illustrates the ray path of a light ray 187 entering array 165 at a 60° entrance angle.

The novel entrance angularity performance of canted asymmetric cube designs results in part from the common orientation of the symmetry axes for the different types of cube corner elements within each asymmetric array. This is in contrast with the non-parallel symmetry axes of canted conventional cube designs. Therefore, another embodiment of this invention comprises an article that is constructed from a machinable substrate which has a plurality of directly machined geometric structures including retroreflective cube corner elements arranged between a plurality of grooves in the substrate. Each of the grooves intersects other grooves at included angles other than 90°, and each cube corner element has a symmetry axis which is in substantially parallel relation to the other symmetry axes. The cant of each cube corner element is preferably within a range of angles between about backward 35° and forward 54°. Retroreflective replicas, including multi-generational replicas, of this article may be made which have the same inventive features as the master article machined from the substrate, and it is recognized that all of the replicas are within the scope of this invention as well as the master article.

The invention permits numerous combinations of structures previously unknown and not possible within the art of retroreflective cube corner element design and manufacture. FIGS. 30 and 31 disclose, in plan and sectional views, asymmetric cube corner element array 191. Array 191 comprises a plurality of cube corner elements each formed from primary and secondary grooves intersecting with included angles 82°, 82°, and 16°. Primary grooves are equally spaced through array 191, with some of the primary grooves mutually intersecting the secondary grooves at locations 194. In this embodiment, the primary grooves 195 have a 30° relief angle, and the secondary grooves 196, 197 have a 3° relief angle. Numerous different retroreflective cube corner elements 198, 199, 200, 201, 202, 203, and 204 are created, comprising cube corner elements at different relative heights and with either three or four sides in this view. These features were simply not possible using previous manufacturing technologies.

With light ray 208 entering array 191 at a 60° entrance angle and a refractive index of 1.59, the array demonstrates an exceptional 63 percent active aperture as schematically shown in FIG. 32. This percent active aperture represents the combined optical performance of multiple differently sized and shaped apertures 212, 213, 214, 215, 216, 217, and 218, intermixed and arranged in close proximity, and corresponding to the different types of retroreflective cube corner elements 198, 199, 200, 201, 202, 203, and 204. Array 191 is also useful in applications requiring high brightness at high entrance angles such as pavement or channel markers, roadway dividers, barriers, and similar uses.

As discussed above, many limiting cases of conventional cube corner element design are surpassed through use of asymmetric methods of manufacture. In some asymmetric designs, cube surfaces having some conventional cube geometries may occur as part of a plurality of cube types in a single array. However, the normal limits of conventional cube shapes and performances are not similarly bounded using asymmetric methods and structures.

Figure 33:
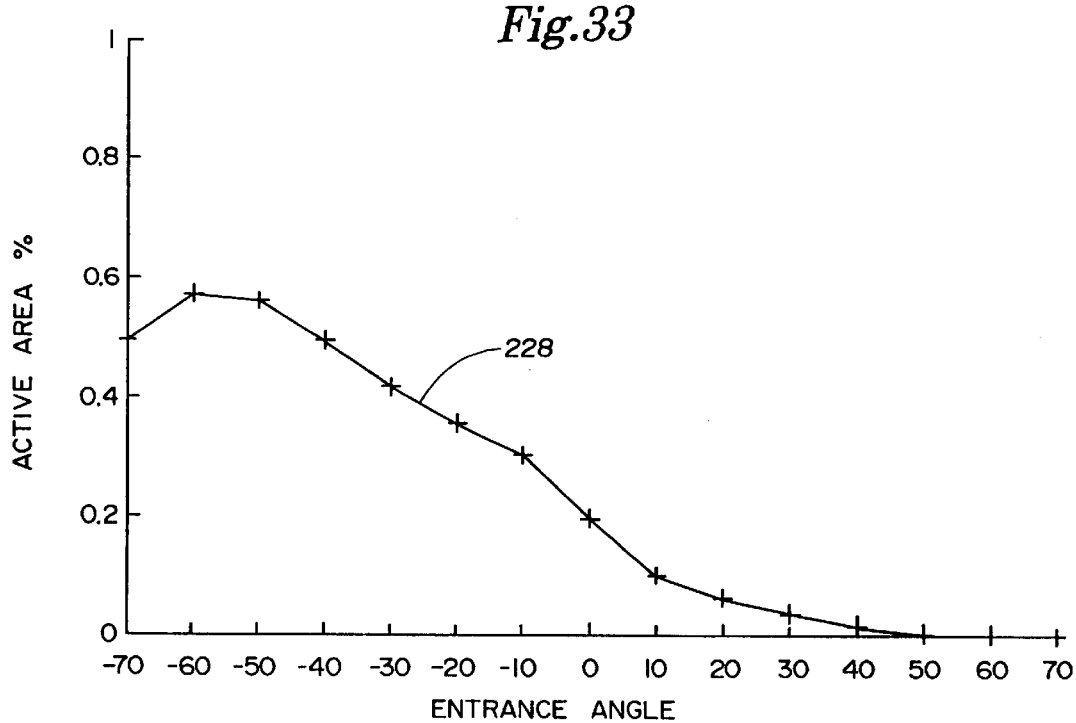
FIG. 33 is a graph showing percent active aperture versus entrance angle for the asymmetric retroreflective cube corner element array shown in FIG. 26.

Another advantage of arrays having asymmetric cube design is the improved entrance angularity in one direction of the array. The design may be specifically tailored to provide peak light return at a desired entrance angle. FIG. 33 is a representative graph depicting percent active area/aperture 228 versus entrance angle for an asymmetric retroreflective cube corner element array shown in FIG. 26 with a refractive index of 1.59. The asymmetrical optical performance based on entrance angle provides efficiencies and other advantages not previously possible in the field of retroreflective cube corner element design and use. Therefore, another embodiment of this invention comprises a retroreflective article or replica which exhibits asymmetric entrance angularity when rotated about an axis within the plane of the substrate from which it is machined. Preferably the article is manufactured by directly machining a substrate to create cube corner elements between three non-parallel sets of parallel grooves.

Figure 24:
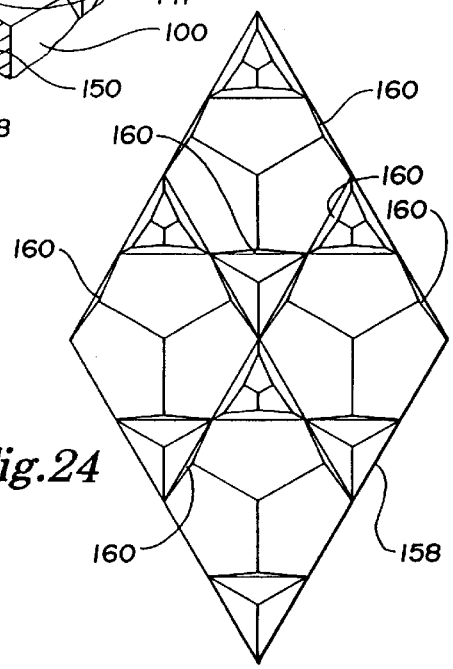
FIG. 24 is a plan view of a portion of a directly machined asymmetric retroreflective cube corner element array having a non-zero relief angle.
Figure 34:
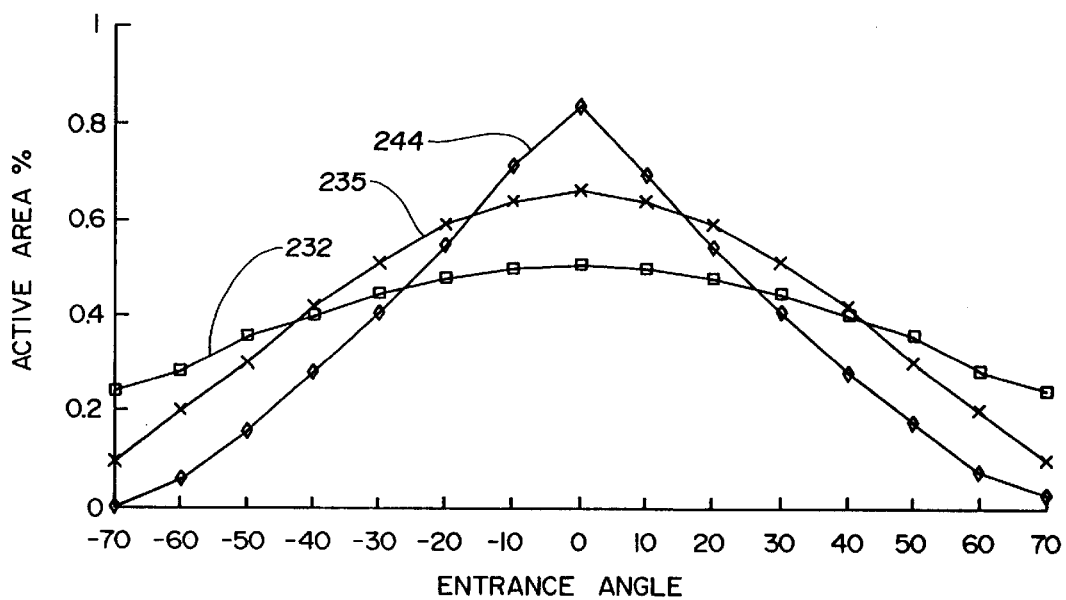
FIG. 34 is a graph showing percent active area versus entrance angle for retroreflective cube corner element arrays shown in FIGS. 6, 8 and 24.

FIG. 34 provides further illustration of the asymmetric optical performance of this class of articles. In the graph of FIG. 34, the optical performance is represented by percent active area/aperture data lines versus entrance angle, and is shown for both conventional and asymmetric designs for a refractive index of 1.59. Data line 232 depicts the performance of a conventional 55°–55°–70° geometry array as shown in FIG. 8; and line 235 depicts a conventional non-canted 60°–60°–60° geometry array as shown in FIG. 6. In contrast, line 244 depicts a non-canted asymmetric array as shown in FIG. 24. A comparison between conventional geometry data lines 232, 235 and asymmetric geometry data line 244 demonstrates that higher active aperture percents are achievable with an asymmetric structure. The asymmetric array well exceeds the limits of conventional array percent active apertures at entrance angles up to about 25°.

This asymmetric geometry is particularly beneficial for use in applications requiring retroreflective sheeting having substantial total light return, such as traffic control materials, retroreflective vehicle markings, photo-electric sensors, internally illuminated signs, and reflective garments. The enhanced optical performance and design flexibility resulting from asymmetric techniques relates directly to improved product performance and marketing advantage.

Total light return for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Metallized or other reflective coatings on a portion of an array may be utilized advantageously in such situations. A portion, in this context, may comprise all or part of an array.

The structure of asymmetric cube corner element arrays relying on total internal reflection is such that total internal reflection breakdown will occur for all cubes simultaneously. This contrasts with conventional arrays, based on matched pairs of cubes, where total internal reflection breakdown occurs for only half of the cubes for a given cube geometry, entrance angle, and refractive index. Asymmetric cube corner element arrays relying on total internal reflection may therefore be beneficially designed as directional retroreflectors for applications such as marine channel markers and passive airport runway markings.

Composite tiling is the technique for combining zones of cube corner elements having different orientations. This is used with conventional arrays to provide sheeting with a uniform appearance at high angles of incidence regardless of orientation. However, composite tiling permits further modification to optical performance of asymmetric arrays, as well as to arrays comprising non-triangular based cube corner prisms.

Figure 35:
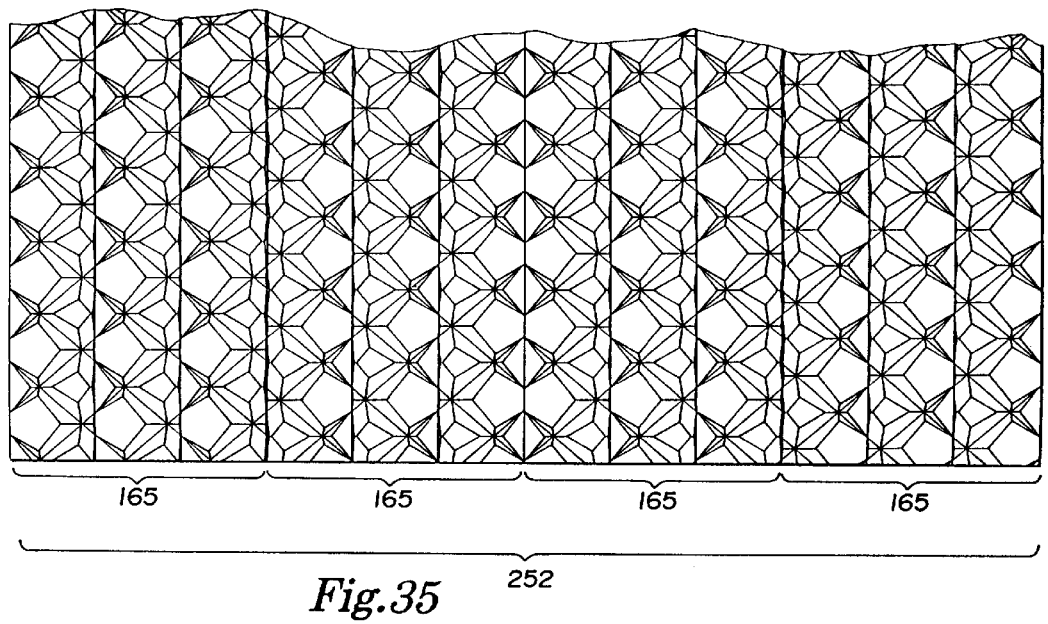
FIG. 35 is a plan view of a portion of a directly machined asymmetric array including several zones of asymmetric arrays.
Figure 36:
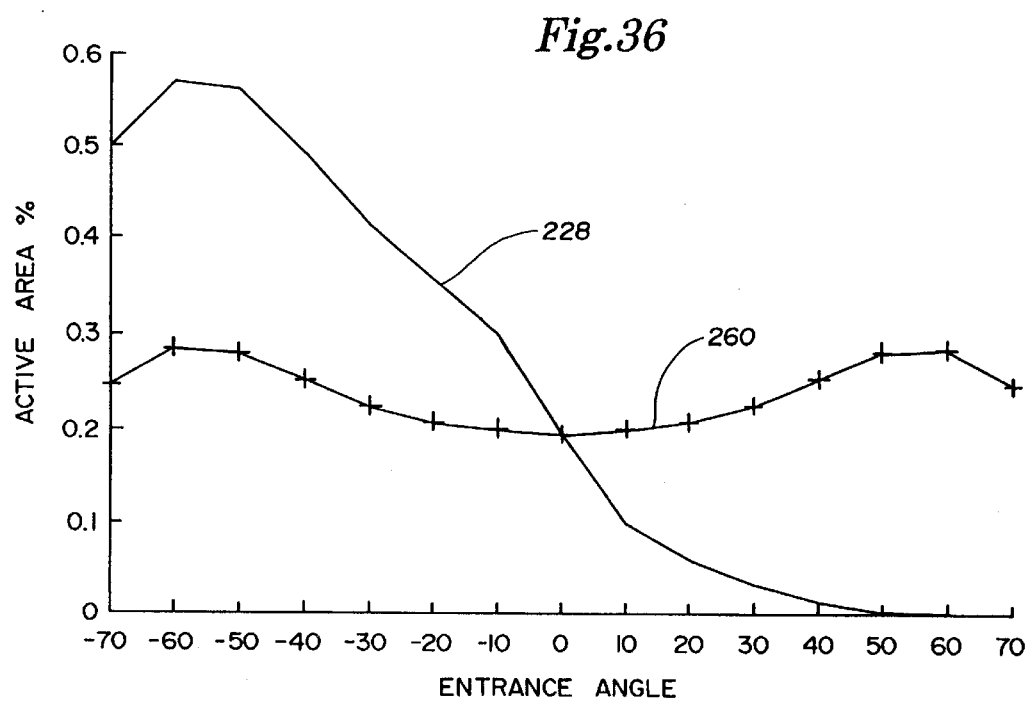
FIG. 36 is a graph showing percent active area/aperture versus entrance angle for one of the individual arrays and the composite array shown in FIG. 35.

Referring to FIG. 35, composite array 252 comprises several zones of asymmetric arrays 165, as shown in FIG. 26. Each of the zones 165 may have a similar size and shape, but each zone is oriented in a 180° relation to adjacent zones. FIG. 36 shows the effect of this particular composite tiling arrangement on percent active aperture. Data line 228 represents the percent active aperture versus entrance angle for array 165. In contrast, data line 260 illustrates a substantially constant value for percent active aperture versus entrance angle for composite array 252 over an extremely wide range of entrance angles. The combined optical effect of numerous zones 165 in a composite array is useful for applications requiring roughly constant brightness over a wide range of entrance angles. Data line 260 also illustrates that composite tiled zones of asymmetric cube corner elements can provide symmetric entrance angularity during rotation about an axis within the plane of the composite array.

The zones of asymmetric arrays may be different sizes and may also be oriented other than 180° relative to adjacent zones. The size of the zones should be selected according to the requirements of particular applications. For example, traffic control applications may require zones which are sufficiently small that they are not visually resolvable by the unaided human eye at the minimum expected viewing distance. This provides a composite array with a uniform appearance. Alternatively, channel marking or directional reflector applications may require zones which are sufficiently large that they can be easily resolved by the unaided human eye at maximum required viewing distance.

FIG. 37 is a side section view of one embodiment of the present invention. This view shows part of an asymmetric array 264 which is similar to array 141 shown in FIG. 21, although this embodiment of the invention may also be used with other array configurations. FIG. 37 further illustrates the advantages of asymmetric manufacturing methods in providing geometric structures at different heights above a common reference plane. These structures may comprise individual retroreflective cube corner elements 268, 269, non-retroreflective pyramids, frustums, posts 282, or other structures positioned above common reference plane 274.

Cube peaks 271, 272, or other features machined from the original substrate, may also be truncated for specialized effect or use. Truncation may be accomplished by various techniques, including, for example, controlling depth of cut of the grooves, or further removal of substrate material after formation of the primary and secondary grooves.

Retroreflective directly machined cube corner-articles are often designed to receive a sealing film which is applied to the retroreflective article in order to maintain a low refractive index material, such as air, next to the retroreflective elements for improved performance. In conventional arrays this medium is often placed in direct contact with the cube corner elements in ways which degrade total light return. However, using asymmetric constructions, a sealing medium 280 may be placed on the highest surface 283 of the array without contacting and degrading the optical properties of lower retroreflective cube corner elements. The highest surface may comprise cube corner elements, non-retroreflective pyramids, frustums, posts, or other structures. In FIG. 37, the highest surface 283 has been truncated. Although slight height variations may result from slight non-uniformity of groove positions or included angle of cube corner elements due to machining tolerances or intentional inducement of non-orthogonality, these variations are not analogous to the variations disclosed and taught in this invention. For arrays using a sealing medium, the truncated surfaces may be used both to hold the medium above the cube corner elements as well as to increase the light transmissivity of the sheeting. Light transmissivity of the sheeting may be increased through use of a transparent or partially transparent sealing medium.

FIG. 38 is a side view of another embodiment of the present invention. This view shows part of an asymmetric array 285 similar to a portion of array 264 in FIG. 37 but including the use of a separation surface 288. The lateral faces 292, 293 of geometric structures 295, 296 form the boundary edges 299, 300 for the separation surface. The lateral faces may be either cube corner element optical surfaces or relief surfaces. The separation surface 288 may have flat or curved portions when taken in cross section.

Separation surfaces may be advantageously utilized to increase light transmission or transparency in sheeting, including flexible sheeting, utilizing asymmetric retroreflective cube corner element arrays. For example, this is particularly useful in articles such as automotive signal light reflectors, which are normally manufactured using injection molding. In the embodiment shown in FIG. 38, separation surfaces are shown in combination with truncated surfaces of highest surfaces 283, although either feature may be utilized independently. Separation surface 288 may be formed using a machining tool with a flat or curved tip, or by further removal of material from a replica of the asymmetric cube corner element array master.

Suitable materials for retroreflective articles or sheeting of this invention are preferably transparent materials which are dimensionally stable, durable, weatherable, and easily replicated into the desired configuration. Examples of suitable materials include glass; acrylics, which have an index of refraction of about 1.5, such as Plexiglas brand resin manufactured by Rohm and Haas Company; polycarbonates, which have an index of refraction of about 1.59; reactive materials such as taught in U.S. Pat. Nos. 4,576,850, 4,582,885 and 4,668,558; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. Transparency of the materials ensures that the separation or truncated surfaces will transmit light through those portions of the article or sheeting.

The incorporation of truncated or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable.

In fully retroreflective articles, materials having high indices of refraction are preferred. In these applications, materials such as polycarbonates, with refractive indices of about 1.59, are used to increase the difference between the indices of the material and air, thus increasing retroreflection. Polycarbonates are also generally preferred for their temperature stability and impact resistance.

FIGS. 39 and 40 illustrate an asymmetric array 305 comprising a plurality of cube corner elements each formed from primary and secondary grooves intersecting with included angles 74°, 74°, and 32°. Each of the primary grooves 308 has a 30° relief angle and each of the secondary grooves 309, 310 has a 3° relief angle. The secondary groove intersection locations 313 are designed with a spacing $D_2$. Three primary grooves are positioned in the partial cube sub-element with varying spacing at $0.20D_2$, $0.55D_2$, and $0.83D_2$ from the secondary groove intersections 313. This pattern is repeated in other partial cube sub-elements.

In the array of FIG. 39, there are six different cube types depicted by numerals 316, 317, 318, 319, 320, and 321. Trihedrons 325, 326 are examples of structures which are not retroreflective because the three faces are not orthogonal. FIG. 40 shows, for entrance angle 60° and refractive index 1.59, the six active apertures 329, 330, 331, 332, 333, and 334, intermixed and arranged in close proximity, and associated with cube types numbered 316 through 321, respectively. Percent active aperture is roughly 63 percent for array 305. The active aperture shapes in this design have roughly equal dimensions both parallel and perpendicular to the primary grooves even at a 60° entrance angle. These roughly circular aperture shapes produce light return patterns which are relatively circular and not significantly distorted due to diffraction. In contrast, conventional arrays specifically designed for high entrance angle high brightness applications exhibit highly elongated aperture shapes which significantly distort light return patterns. The asymmetric array 305 is particularly useful in applications requiring high brightness at high entrance angles, such as pavement or channel markers, roadway dividers, barriers, and similar uses.

Various modifications and alterations of this invention will become apparent to those skilled in the art without departing from the scope and spirit of this invention.

What is claimed:

1. A cube corner article comprising a substrate having a base surface and a structured surface including a plurality of geometric structures formed by at least three intersecting groove sets, each geometric structure including three faces arranged as a cube corner element, at least some of the geometric structures also including a fourth face which is not part of a cube corner element, wherein at least one groove of the at least three intersecting groove sets has a groove bottom from which one of the three faces of one geometric structure, and the fourth face of a different geometric structure, extend uniformly.

2. The cube corner article of claim 1, wherein the at least one groove comprises substantially every groove in at least one of the three intersecting groove sets.

3. The cube corner article of claim 1, wherein the at least one groove comprises every groove in at least one of the three intersecting groove sets.

4. The cube corner article of claim 1, wherein:
   the first side surface forms a first angle with the base surface of the substrate and the second side surface forms a second angle with the base surface, the first angle being not equal to the second angle.

5. The cube corner article of claim 1, wherein:
   each cube corner element has a symmetry axis, the symmetry axes of substantially every cube corner element being canted in the same direction.

6. The cube corner article of claim 1, wherein:
   a plurality of grooves within one of the three intersecting groove sets intersect the remaining groove sets at least 0.01 millimeters from the intersection of the remaining groove sets.

7. The cube corner article of claim 1, wherein:
   at least two grooves have groove bottoms disposed respectively at different distances above a base plane.

8. The cube corner article of claim 1, wherein:
   the distance between grooves in at least one of the three intersecting groove sets is not equal to the distance between grooves in at least another of the sets.

9. The cube corner article of claim 1, wherein:
   at least one of the three intersecting groove sets includes parallel grooves which are not equidistant.

10. The cube corner article of claim 1, wherein:
    at least one of the three faces is arcuate over a significant portion of its surface.

11. The cube corner article of claim 1, wherein:
    the article has a percent active area as a function of entrance angle which is asymmetric with respect to zero entrance angle.

12. The cube corner article of claim 1, wherein:

the article exhibits greater than 70% active aperture in response to light incident on the base surface at an incidence angle approximately perpendicular to the base surface, the base surface being disposed opposite the structured surface.

13. The cube corner article of claim 1, wherein:

the substrate comprises a substantially optically transparent material suitable for use in retroreflective sheeting.

14. The cube corner article of claim 1, wherein:

a portion of the article is optically transmissive.

15. The cube corner article of claim 1, further comprising:

a sealing medium connected with a portion of the substrate.

* * * * *